United States Patent
Takagi

(10) Patent No.: US 11,972,163 B2
(45) Date of Patent: Apr. 30, 2024

(54) PROCESSING JOB INFORMATION OF AN IMAGE FORMING APPARATUS IN A PLURALITY OF STORAGE REGIONS FOR EXTERNAL TRANSMISSION AND STORAGE

(71) Applicant: Canon Kabushiki Kaisha, Tokyo (JP)

(72) Inventor: Noriko Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 17/971,770

(22) Filed: Oct. 24, 2022

(65) Prior Publication Data

US 2023/0161526 A1  May 25, 2023

(30) Foreign Application Priority Data

Nov. 22, 2021 (JP) .................................. 2021-189529

(51) Int. Cl.
*G06F 3/12* (2006.01)

(52) U.S. Cl.
CPC .......... *G06F 3/1245* (2013.01); *G06F 3/1206* (2013.01)

(58) Field of Classification Search
None
See application file for complete search history.

(56) References Cited

U.S. PATENT DOCUMENTS

2005/0105923 A1* 5/2005 Utsunomiya .......... G03G 15/70
                                                        399/21
2021/0170772 A1* 6/2021 Maeda ................. B41J 2/16505

FOREIGN PATENT DOCUMENTS

JP        2006-127287 A      5/2006

* cited by examiner

*Primary Examiner* — Eric A. Rust
(74) *Attorney, Agent, or Firm* — Venable LLP

(57) ABSTRACT

An image processing apparatus reserves a plurality of regions including a region of log information; converts image data from a first region into data in a predetermined format; controls execution of conversion if a conversion condition is satisfied and storage of the converted data in a second region; externally transmits log information that includes job attribute information corresponding to converted data based on the converted data that are stored in the second region; executes conversion of unprocessed image data and transmission of log information based on the converted data even if the conversion condition is not satisfied if an amount of job-related information that is stored in the first region or the second region satisfies a predetermined condition.

10 Claims, 11 Drawing Sheets

1001 Destination setting

Destination :
- URL: http://server.co.jp/folder
- Username: user01
- Password: *******

1002 Transfer setting

Transmission start time : 23:00

1003 Client state

1004 Status : Storage region is close to the upper limit

1005 Execute immediately

1006 Operation setting when storage region is close to the upper limit

1007 Priority setting for image conversion processing
- ◉ Give priority to job execution performance of device
- ◎ Give priority to reservation of storage region 1008 Priority setting for transmission processing
- ◉ Give priority to transfer time setting
- ◎ Give priority to reservation of storage region 1009 Set

PROCESSING JOB INFORMATION OF AN IMAGE FORMING APPARATUS IN A PLURALITY OF STORAGE REGIONS FOR EXTERNAL TRANSMISSION AND STORAGE

BACKGROUND OF THE INVENTION

Field of the Invention

The present invention relates to an image processing apparatus that manages information related to a job executed on a device, a control method for the image processing apparatus, and a storage medium.

Description of the Related Art

Image forming apparatuses (or image processing apparatuses), for example, multi-functional peripherals, execute jobs such as printing, copying, and facsimile transmission and reception. Image forming apparatuses have the function of storing job information (information indicating when, who, where, and what kind of job was executed) and the image data used for the job (hereinafter, referred to as a "job image") for each job. Since new job information and job images cannot be stored any more when the storage region for storing job information and job images reaches the upper limit of its capacity, the image forming apparatus performs control to prevent the execution of a new job.

Additionally, in the image forming apparatus, a function is provided in which applications, such as extension applications, can be installed later and the extension application then controls the image forming apparatus, and acquires the job information and the job image. In the extension application, a function is provided in which the capacity of the storage region of the image forming apparatus is monitored and when the extension application detects that the capacity is close to the upper limit, all job information and job images in the image forming apparatus are saved on an information processing apparatus.

Here, the job image that the image forming apparatus stores is converted into an image format dedicated to the image forming apparatus that is appropriate for the processing in the image forming apparatus, and the converted images are stored. For example, in the case of a print job, an image format that is dedicated to printing is used in the image forming apparatus so that optimum image quality and speed for printing on paper can be realized. In contrast, in the case of a function for sending scanned data to a personal computer, the scanned image is converted into a general-purpose image format including PDF or JPEG, and is sent to the personal computer. To realize these functions, the image forming apparatus has an image conversion function for converting the above job images to a general-purpose image format. Furthermore, the image forming apparatus provides a means for disclosing the image conversion function to the extension application and allowing the extension application to control the image conversion function.

Conventional image conversion functions do not support all of the image formats that the image forming apparatus handles due to a lack of hardware resources on the side of the image forming apparatus. For this reason, the job image in the image format dedicated to the image forming apparatus is transmitted to the information processing apparatus, and subsequently, image conversion is performed in the information processing apparatus. In the information processing apparatus, a job image obtained by converting the image into a general-purpose image format and job information are stored in association with each other as a job history. However, in recent years, with the availability of high-performance CPUs and memories at low costs, and enhanced hardware resources for image forming apparatuses, image conversion functions that support all image formats can be realized.

When the extension applications to be installed on the image forming apparatus use the image conversion function provided by the image forming apparatus, the job image needs to be stored in a region that is different from the region where the conventional extension applications store job information and job images. Accordingly, three storage regions, a storage region for job information, a storage region for job images, and a storage region for job histories are prepared.

Japanese Patent Application Laid-Open Publication No. 2006-127287 discloses a technique related to a backup and restore function in an image forming apparatus against an unexpected power interruption or the like. The information management unit of the information processing apparatus performs control of a RAM serving as a main storage means, a NVRAM serving as a nonvolatile storage means, and an SD card serving as an auxiliary storage means. When the RAM is changed, the change history of the RAM is managed in a cache area of the NVRAM. When the NVRAM reaches a near full state in which the storable capacity is close to the upper limit, the data from the RAM are stored in the SD card and the change history of the NVRAM is cleared.

However, Japanese Patent Application Laid-Open Publication No. 2006-127287 is a technique related to a backup and restoring function against an unexpected power interruption or the like in an image forming apparatus. Therefore, in the case in which a plurality of storage regions is present since the extension application is using the image conversion function that is provided by the image forming apparatus, the problem of how to process job-related information in a plurality of storage regions has yet to be solved.

SUMMARY OF THE INVENTION

The present invention has been made in view of the above problems, and according to the present invention, when an image processing apparatus uses an image conversion function, information related to a job in a plurality of storage regions is processed.

To achieve the above purpose, an image processing apparatus according to the present invention is an image processing apparatus that records log information related to image data and job attribute information for one or more executed jobs, wherein the image processing apparatus comprises a storage unit that reserves a plurality of regions including a region for the log information; a conversion unit that converts image data from a first region into data in a predetermined format; a control unit that controls execution of conversion performed by the conversion unit if a conversion condition is satisfied and storage of the converted data in a second region; a transmission unit that externally transmits log information that includes job attribute information corresponding to the converted data based on the converted data that are stored in the second region; an execution unit that executes conversion of unprocessed image data in the first region performed by the conversion unit and transmission of the log information performed by the transmission unit based on the converted data even if the conversion condition is not satisfied if an amount of job-related information that is stored in the first region satisfies a first condition; and the execution unit further executes conversion of the unprocessed image data in the first region performed by the conversion unit and transmission of the log information performed by the transmission unit based on the converted data even if an amount of job-related information that is stored in the second region satisfies a second condition.

Further features of the present invention will become apparent from the following description of exemplary embodiments (with reference to the attached drawings).

BRIEF DESCRIPTION OF THE DRAWINGS

FIG. 10 shows an example of a screen of the extension application.

DESCRIPTION OF THE EMBODIMENTS

Hereinafter, embodiments of the present invention will be described with reference to the drawings. Note that the following embodiments do not limit the claimed invention, and not all of the combinations of features described in the embodiments are essential to the means for solving the invention.

Figure 1:
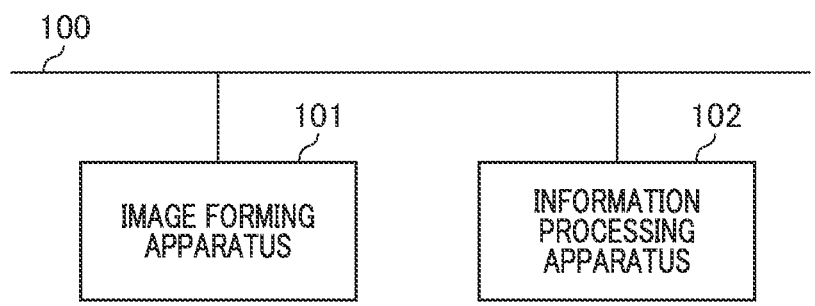
FIG. 1 illustrates a diagram of the overall configuration of a system according to the present embodiment.

FIG. 1 is a diagram of the overall configuration of a system according to the present embodiment. An image forming apparatus 101 and an information processing apparatus 102 are connected to a network 100 and they are communicable with each other. Although, in the present embodiment, a single image forming apparatus and a single information processing apparatus are described, a plurality of image forming apparatuses and a plurality of information processing apparatuses may be connected to the network 100. Additionally, each of the functions of the image forming apparatus 101 and the information processing apparatus 102 may be configured on the same device.

The image forming apparatus 101 has functions such as scanning, printing, copying, faxing, and sending, and executes jobs by user operations. The image forming apparatus 101 also has a job information recording function for generating job information and a job image for an executed job, after the execution of the job or during the execution of the job, and storing them in a storage device.

The image forming apparatus 101 has a function for installing an extension application and allowing the extension application to control the image forming apparatus. One example of the extension application is a client that converts the job image stored by the job information recording function described above into a general-purpose image format and stores it together with the job information as a job history. Additionally, the client sends the job history to the information processing apparatus 102 to be described below, which has been registered in advance. Thus, the image forming apparatus 101 in the present embodiment is an example of an image processing apparatus that records log information related to the image data (job image) and the job attribute information (job information) for one or more executed jobs.

To achieve these functions, the image forming apparatus may be a digital multi function peripheral (MFP). MFP is an abbreviation of "Multi Function Peripheral". Although in the present embodiment, the extension application can be installed later, a configuration in which the extension application is pre-installed as a standard configuration of the image forming apparatus may also be adopted.

The information processing apparatus 102 receives connections from the client, which is an example of the extension application, and stores the job history that the client sends in a database or in a predetermined folder. The database may be constructed on the information processing apparatus 102 or may be constructed on another device (not illustrated). The information processor 102 also stores the setting values and status of the client. Here, a server application may be installed in the information processing unit 102. Additionally, file sharing functions such as WebDAV and SMB may be used in the information processing apparatus 102. WebDAV is an abbreviation of "Web-based Distributed Authoring and Versioning". SMB is an abbreviation of "Server Message Block". The network 100 is a connection line for connecting the image forming apparatus 101 and the information processing apparatus 102 with each other, for which a LAN, a WAN or a wireless communication network is used. Additionally, the network 100 may be the Internet.

Figure 2:
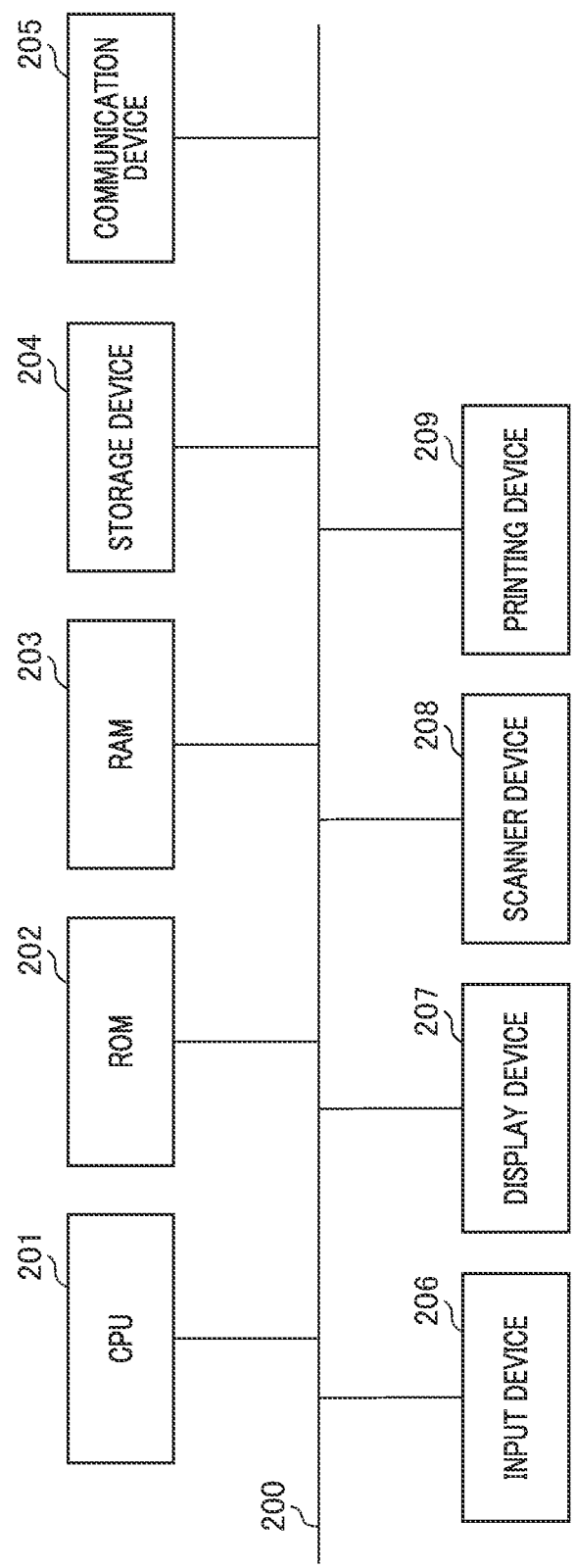
FIG. 2 is a block diagram showing an example of a hardware configuration.

FIG. 2 is a block diagram showing an example of a hardware configuration. FIG. 2 illustrates an example of the hardware configuration for the image forming apparatus 101 and the information processing apparatus 102 that are shown in FIG. 1. The hardware configuration for a general information processing apparatus can be applied to a personal computer or the image forming apparatus in the present embodiment. Specifically, the hardware configuration is as follows.

A CPU 201 integrally controls the overall hardware and controls each of the units that are connected to a bus 200 to execute each of the functions such as printing and scanning. A ROM 202 is a memory dedicated to reading data, and stores, for example, a basic control program of the image forming apparatus. A RAM 203 is a memory capable of reading/writing data, and is used as, for example, a working memory of the CPU 201. A storage device 204 is used as a storage region for temporary data during the execution of each program, and a storage region for permanent data. Although, in many cases, an HDD is used as the storage device 204, devices that can read/write data by loading external media such as a CD, a DVD, and a memory card may be used. A communication device 205 connects the image forming apparatus 101 and the information processing apparatus 102 to, for example, a LAN, so as to enable data communication by TCP/IP between the devices.

An input device 206 is an operation unit for receiving an input operation of characters and data from a user. For example, the input device 206 is a keyboard, a mouse, a hard key, and a touch panel. A display device 207 is a device for displaying various screens, such as a liquid crystal display and a touch panel. A user provides an instruction on a user interface screen displayed on the display device 207 via the input device 206 and performs a job execution instruction and a setting instruction to the image forming apparatus 101. In the image forming apparatus 101, a scanner device 208 and a printing device 209 are also connected to the bus 200. The scanner device 208 scans an original to acquire information regarding the original as image data. The printing device 209 outputs data such as image data to a recording medium.

Figure 3:
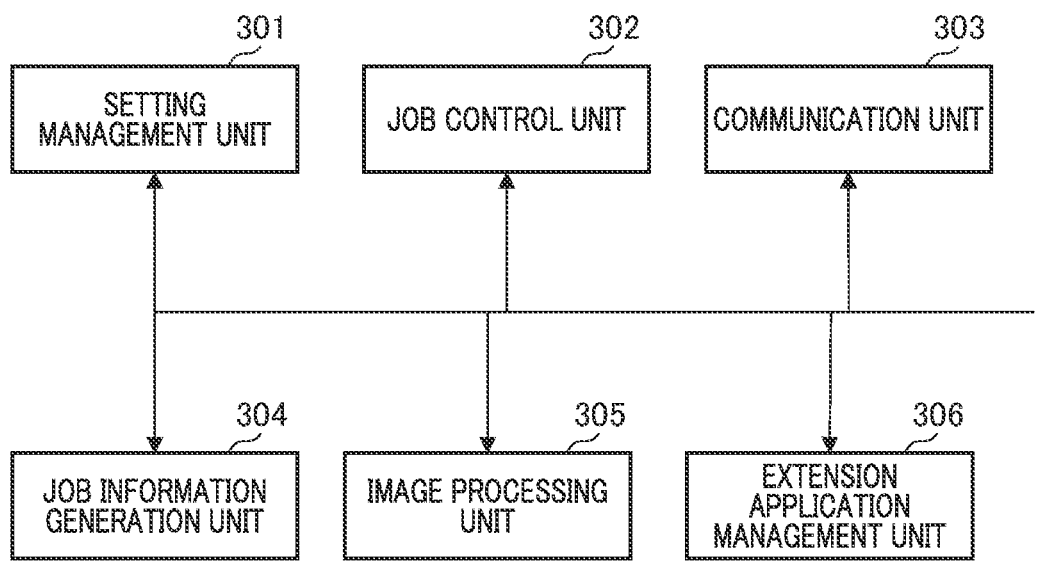
FIG. 3 is a block diagram showing an example of a software configuration of an image forming apparatus.

FIG. 3 is a block diagram showing an example of a software configuration for the image forming apparatus 101. The software configuration shown in FIG. 3 is realized by the CPU 201 reading a program stored in, for example, the ROM 202 into the RAM 203 and executing it.

A setting management unit 301 stores settings related to the execution of various functions of the image forming apparatus 101 in each of the storage devices such as the RAM 203 and the storage device 204, and reads out the settings from each of the storage devices. In this context, the settings include a copy setting for executing the copy function, a print setting for executing the print function, and a network setting. The settings also include a setting as to whether or not to generate job information and a job image when a job is executed.

A job control unit 302 controls the scanner device 208 and the printing device 209 so as to execute various jobs based on a job execution request input by the input device 206 or received by a communication unit 303. For example, in the case of a job for storing a re-printable document, a print job that the communication unit 303 receives from a personal computer (not illustrated) is converted into an image format dedicated to printing and stored in the storage device 204. The job for printing the re-printable document that has been stored is executed by a user instruction via the input device 206 of the image forming apparatus 101.

The communication unit 303 performs communication and receives a print job and a job execution request from, for example, a personal computer (not illustrated). A job information generation unit 304 generates job information and a job image after the job execution of the job control unit 302 or during the job execution of the job control unit 302 and stores them in the storage device 204.

In response to a request from the job control unit 302, an image processing unit 305 executes image processing on the image data associated with the job execution. Additionally, in response to a request from the extension application, the image processing is executed on a job image that is image data used for the job. The image processing includes image format conversion, and resolution conversion and image quality reduction for reducing the size of the image data. Thus, the reference numeral 305 in the present embodiment shows an example of a conversion means for converting the image data of the first region into data in a predetermined format.

An extension application management unit 306 performs installation, starting, stopping, and uninstallation of the extension application. For example, the extension application management unit 306 may start the extension application by detecting the start of the image processing apparatus and may stop the extension application by receiving a stop instruction from the user via the input device 206.

Figure 4:
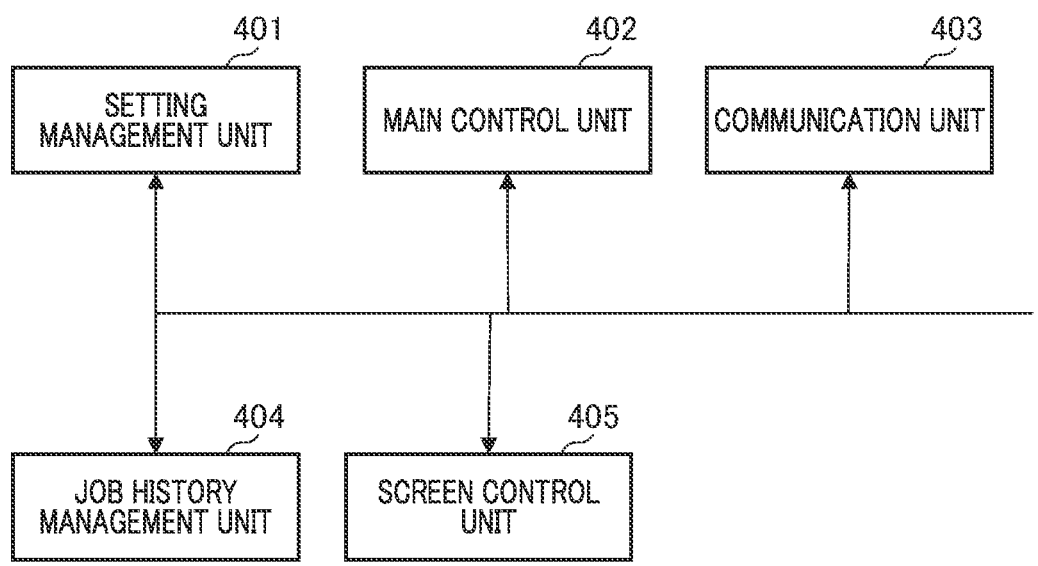
FIG. 4 is a block diagram showing an example of a software configuration of an extension application.

FIG. 4 is a block diagram showing an example of a software configuration for the extension application. Specifically, FIG. 4 shows an example of a software configuration for a client that is an extension application of the image forming apparatus 101. The software configuration shown in FIG. 4 is realized by the CPU 201 reading out a program that is stored in the storage device 204 and executing the program in, for example, the RAM 203.

A setting management unit 401 stores various setting values of the client in the storage device 204 and reads out the setting values as necessary. In this context, the setting values include a URL for the information processing apparatus 102 to which the job history is transmitted, and a transmission schedule of the job history.

A main control unit 402 controls the overall client. The main control unit 402 receives start instructions and stop instructions through the extension application management unit 306, and acquires the setting through the setting management unit 401 and operates the client according to the setting.

A communication unit 403 transmits the job history to the information processing apparatus 102, in response to an instruction from a job history management unit 404. The communication unit 403 also transmits the setting information and the status information.

The job history management unit 404 acquires the job information that the image forming apparatus 101 has stored in the storage device 204 in response to an instruction from the main control unit 402, and performs the image conversion of the job image via the image processing unit 305. The job image on which image conversion has been performed and the job information are transmitted to the information processor 102 via the communication unit 403, as the job history. Furthermore, the job history management unit 404 deletes the job history that has been transmitted to the information processing apparatus 102 from the storage device 204.

The screen control unit 405 causes the display device 207 to display a screen and receives instructions from the user via the input device 206.

Figure 5A:
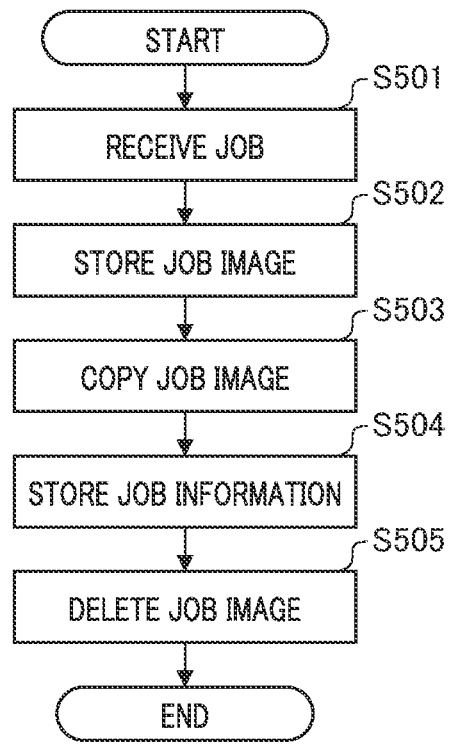
FIG. 5A and FIG. 5B are flowcharts showing job execution processing of the image forming apparatus.
Figure 5B:
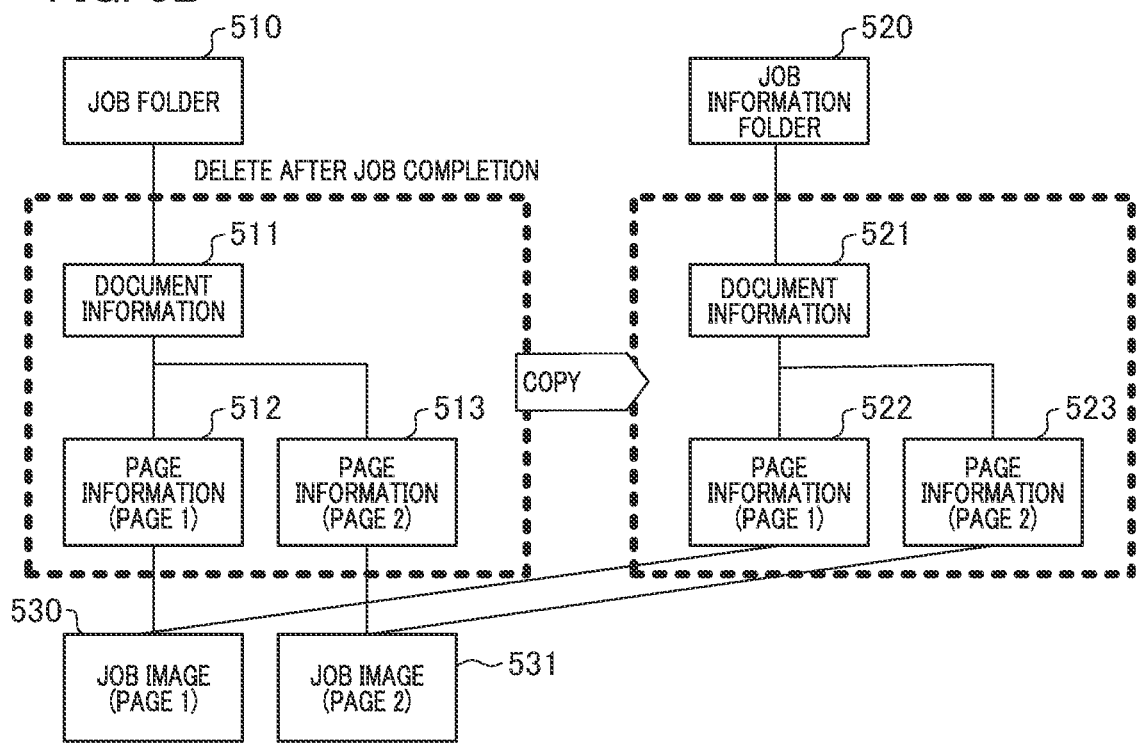

FIGS. 5A, 5B, and 5C are flowcharts showing job execution processing of the image forming apparatus 101. The job execution processing is performed, for example, when a print job is input from a personal computer (not illustrated), or when a job execution instruction is received from a user via the input device 206. An example of the configuration of the storage device 204 will be described with reference to the drawings.

In step S501, the job control unit 302 receives a print job that is input from a personal computer (not illustrated), or a job that is input by a user via the input device 206.

Figure 12:
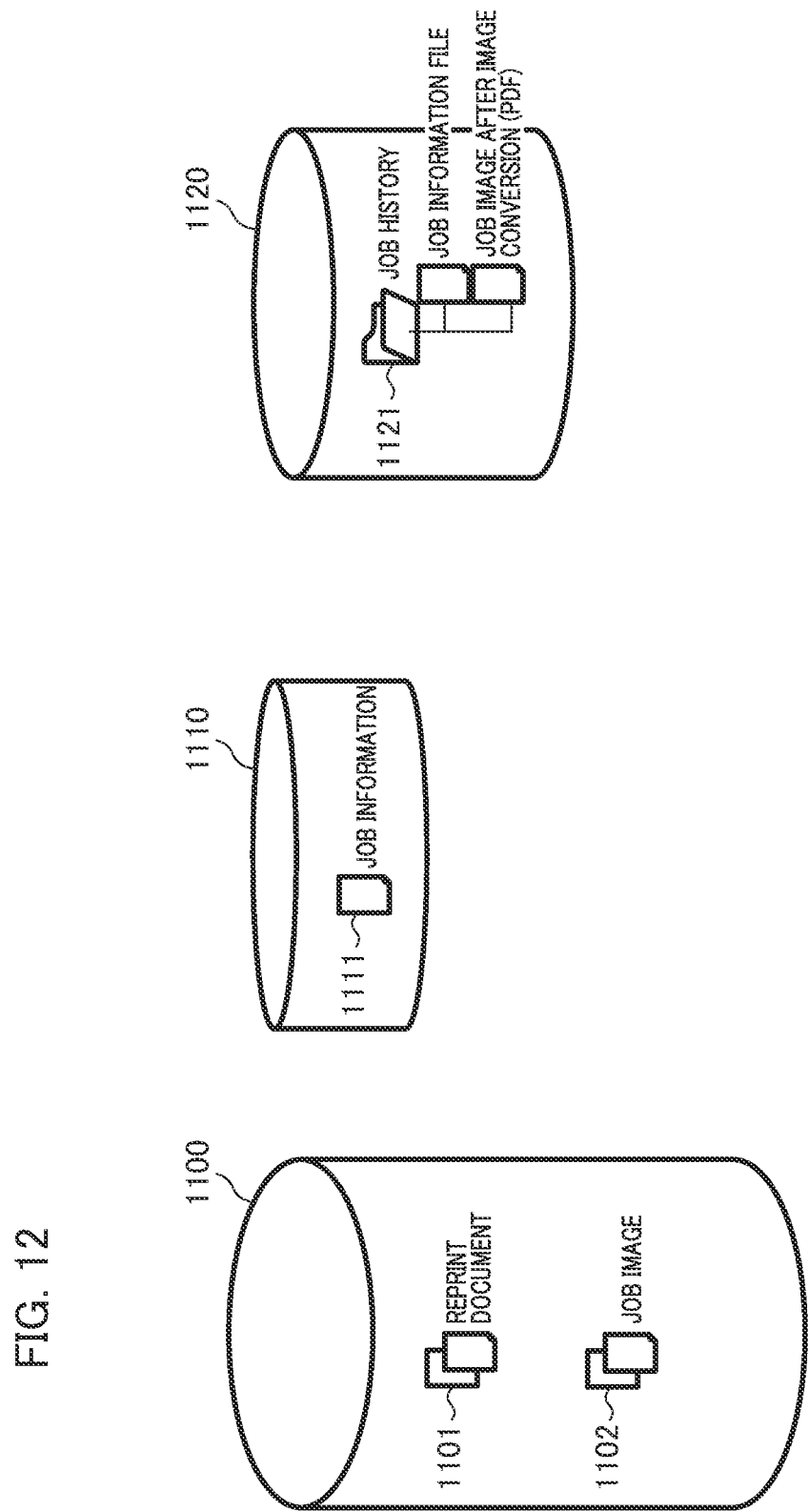
FIG. 12 shows an example of a configuration of a storage region for which the extension application performs the storable capacity check.

In step S502, the job control unit 302 acquires a job image from the job received in step S501 and stores the job image in a job image storage region 1100 of the storage device 204 (refer to FIG. 12). In this case, the data are stored in, for example, a job folder 510 shown in FIG. 5B, which is used for deleting the data after the job execution has been completed. The configuration of the information that is stored in the folder are, for example, document information 511 that is generated in job units, page information 512 and 513 that is generated in units of pages associated with the document, and job images 530 and 531 that are associated with the page information.

In step S503, the job control unit 302 copies the job image that has been stored in step S501 via the job information generation unit 304 and stores the job image in the job image storage region 1100. In this case, the data are stored in, for example, a job information folder 520 shown in FIG. 5B, which can be deleted by a client that is the extension application at an arbitrary timing. During the copy processing, logical copy is performed, only document information 521 that is generated in job units, and page information 522 and 523 that is generated in units of pages associated with the document are copied, and the job images 530 and 531 associated with the page information are not copied. Thus, since duplicates of the job images are not held, the storage capacity of the storage device 204 can be reduced.

In step S504, the job control unit 302 generates the job information via the job information generation unit 304 and stores the job information in the storage device 204. For example, the job information storage region 1110 shown in FIG. 12 is configured in the storage device 204 and the job information is stored therein. Additionally, the document information 521 is included in the job information as link information to the job image, so that the page information 522 and 523, or the job images 530 and 531 can be handled through the document information 521. The job information may be included in the document information 521.

Table 1 below shows an example of job information.

TABLE 1

| Job information | Job type | Print |
|---|---|---|
| | Execution date and time | 2021/10/05 |
| | Number of pages | 5 |
| | Document information ID | Doc0000A |
| | . . . | |
| Authentication setting | Account name | User A |
| | Password | AAA |
| | . . . | |
| Device information | Device nams | printer000001 |
| | Device management No. | 00001 |
| | Location | Head office |
| | . . . | |

The job information is generated in executed job units. For example, in the job information, the type of job operation performed by the user is stored as a job type. In the example in Table 1, "Print" is stored. The date and time when the job has been executed is stored as the execution date and time, and the number of pages of the document that has been used in the job is stored as the number of pages. In the document information ID, "Doc0000A" is stored as an example of the document information 521. "Doc0000A" is an example of IDs assigned to be unique to documents that have been generated in job units, and is information indicating the document information 521. The client can instruct the image processing unit 305 to execute the image processing for the document information 521, the page information 522 and 523, and the job images 530 and 531, by indicating "Doc0000A".

In the authentication setting, the username and the password are stored. In addition, information regarding the domain name and the authentication method may be stored. In the device information, the information regarding the image forming apparatus 101 that has executed the job is stored.

In step S505, when the job is completed, the job control unit 302 deletes the job information stored in step S502 from the storage device 204. Specifically, the document information 511 and the page information 512 and 513 are deleted. Since logical copy is performed in step S503, the job images 530 and 531 are not deleted.

Figure 6:
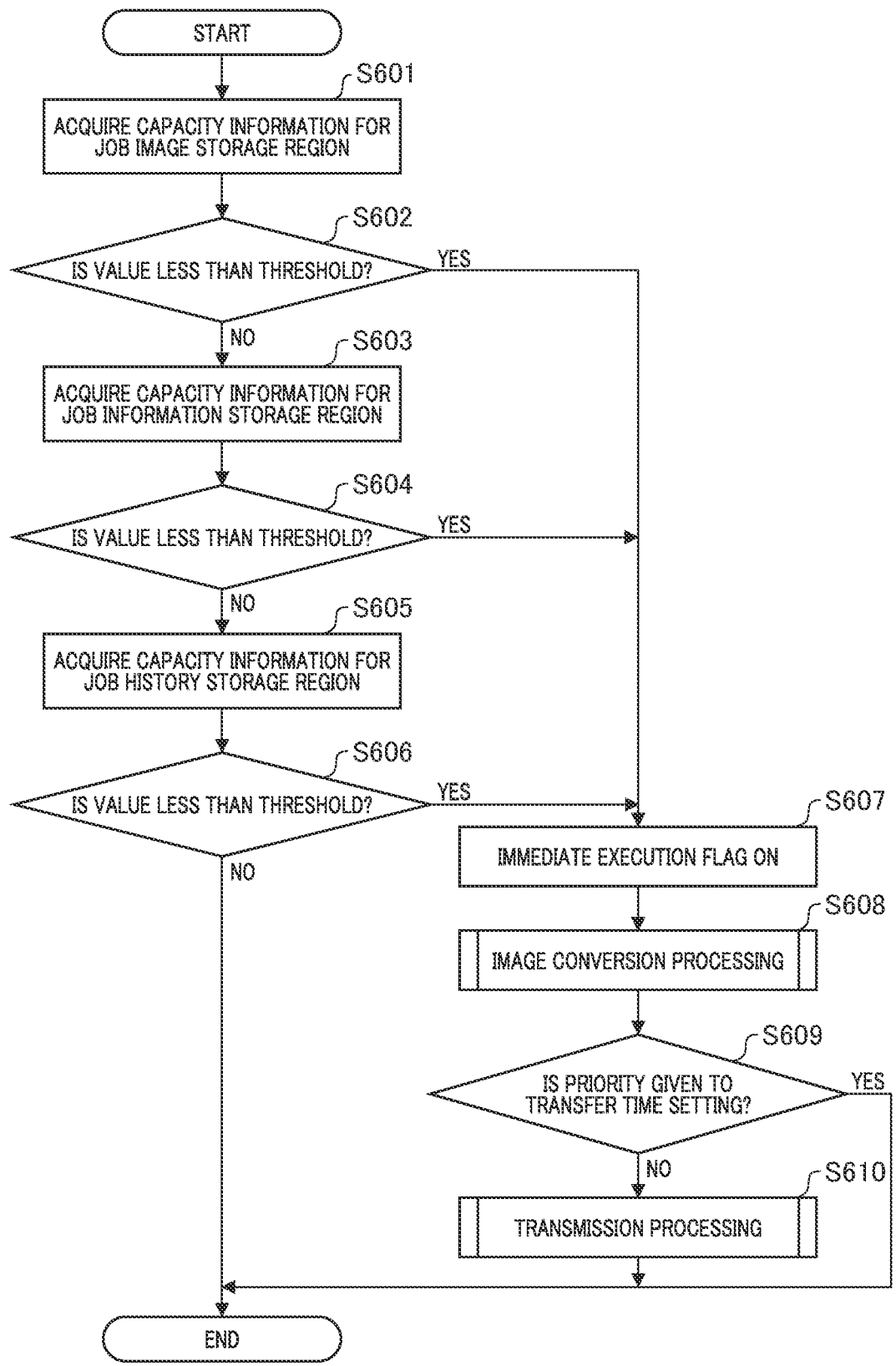
FIG. 6 is a flowchart showing storable capacity checking processing performed by the extension application.

FIG. 6 is a flowchart showing the storable capacity checking processing that the extension application performs. Specifically, FIG. 6 shows the storable capacity check processing for the storage region that is periodically performed by the job history management unit 404 of the client, which is an extension application. The client periodically performs the storable capacity check for each storage region of the storage device 204.

First, a storage region for which the client performs the storable capacity check will be described with reference to FIG. 12. FIG. 12 illustrates an example of a configuration of a storage region for which the extension application performs the storable capacity check. FIG. 12 illustrates a configuration of the storage device 204. There are cases in which the image corresponding to the job information for the job which the image forming apparatus executes is an image format dedicated to the image forming apparatus. In order to change the image format to a general-purpose image format in the image forming apparatus 101, at least two storage regions, for before image conversion and for after image conversion, are provided. In the storage device 204 in the present embodiment, for example, the job image storage region 1100, the job information storage region 1110, and a job history storage region 1120 are provided. In these regions, a form in which g files are stored in a file system may be adopted, or a form in which files are stored in a database may be adopted. The job image storage region 1100 in the present embodiment is an example of a first region from among a plurality of regions that the storage means reserves, and the job history storage region 1120 is an example of a second region from among the regions that the storage means reserves. The job information storage region 1110 is an example of a third region from among the regions that the storage means reserves.

The job image storage region 1100 is a region that includes the job image stored in step S502 and the job image obtained by logical copy in step S503. Additionally, in the job image storage region 1100, for example, a document for the user to use for reprinting may be stored, in addition to the job image. A sufficient region is reserved for the job image storage region 1100 so that these images are stored.

The job information storage region 1110 is a region including the job information stored in step S504. As described above, for example, the job information includes link information for a job image (document information 521 shown in Table 1). The job information is generated in job units. Since the job information is text information as shown in Table 1, the size of the region prepared as the job information storage region 1110 does not necessarily have to be large.

The job history storage region 1120 is a region for storing the job history in step S709 in FIG. 7, which will be described below. For example, a job information file and a job image after image conversion, which are used as a job history, are collected in a job history folder 1121. The job image after image conversion is an image stored in step S708 and is a file in a general-purpose image format including a PDF. Since the size of the image file can be reduced by conversion to the general-purpose image format, the region size prepared as the job history storage region 1120 does not necessarily have to be larger than the job image storage region 1100. The client performs the storable capacity check for these regions, by the next step shown in FIG. 6.

In step S601, the job history management unit 404 acquires the information regarding the capacity of the job image storage region 1100. Specifically, it acquires the total storable capacity, and the used storage capacity or the available capacity.

In step S602, the job history management unit 404 confirms whether or not the value is less than the threshold based on the capacity information acquired in step S601. In the case in which the threshold is set to, for example, 20%, when the value obtained by subtracting the used storage capacity from the total storable capacity is less than a value that is 20% of the total, the value is determined to be less than the threshold. Alternatively, when the value obtained by subtracting the available storage capacity from the total storable capacity is higher than a value that is 80% of the total, it may be determined that the value is less than the threshold. When it is determined that the value is lower than the threshold, the process proceeds to step S607, and if it is determined that the value is not less than the threshold, the process proceeds to step S603. In this context, the job-related information includes the job information and the information regarding the job image. Therefore, whether or not the amount of the job-related information relative to the storable capacity of the job image storage region 1100 satisfies a condition in which the value exceeds a predetermined threshold (first condition) is determined based on the threshold in step S602 in the present embodiment. That is, the threshold is an example of a predetermined threshold used for determining whether or not the amount of the job-related information relative to the storage capacity satisfies the first condition.

In step S603, the job history management unit 404 acquires the information regarding the capacity of the job information storage region 1110. Specifically, it acquires the total storable capacity and the used storage capacity or the available storage capacity.

In step S604, the job history management unit 404 confirms whether or not the value is less than the threshold based on the capacity information acquired in step S603. The contents of the processing are the same as those in step S602. If it is determined that the value is less than the threshold, the process proceeds to step S607, and if it is determined that the value is not less than the threshold, the process proceeds to step S605.

In step S605, the job history management unit 404 acquires the information regarding the capacity of the job history storage region 1120. Specifically, it acquires the total storable capacity, and the used storage capacity or the available storage capacity.

In step S606, the job history management unit 404 confirms whether or not the value is less than the threshold based on the capacity information acquired in step S605. The contents of the processing are the same as those in step S602. If it is determined that the value is lower than the threshold, the process proceeds to step S607, and if the value is not lower than the threshold, the storable capacity check processing ends. Here, whether or not the amount of the job-related information relative to the storable capacity of the job image storage region 1100 satisfies a condition in which the value exceeds a predetermined threshold (second condition) is determined based on the threshold in step S606 in the present embodiment. That is, the threshold is an example of a predetermined threshold used for determining whether or not the amount of the job-related information relative to the storable capacity satisfies the second condition.

In step S607, the job history management unit 404 determines, as a result of the storable amount check processing, that the capacity of one of the storage regions of the image forming apparatus 101 is close to the upper limit, and sets the immediate execution flag to ON. The immediate execution flag is information indicating that the job history management unit 404 sequentially transmits the job history to the information processing apparatus 102 upon the completion of image conversion and the generation of the job history in the process shown in FIG. 7, which will be described below. That is, when the immediate execution flag is ON, the transmission of the image data converted at the end of the job image conversion processing is performed.

When the job history management unit 404 determines that the capacity of the storage region is close to the upper limit, the job history management unit 404 immediately transmits the job information, the job image, and the job history information stored in the image forming apparatus 101 to the information processing apparatus 102. Thus, the job history management unit 404 in the present embodiment functions as an execution means that immediately executes the conversion of the job image and externally transmits the job history information and the like when it determines that the capability of the storage region is close to the upper limit. When the immediate execution flag is OFF, the transmission processing shown in FIG. 8, which will be described below, is executed at a predetermined interval or at a predetermined time.

Here, it may be possible to transmit results to the information processing apparatus 102 that indicate that the capacity of the storage region has been determined to be close to the upper limit. Specifically, the job history management unit 404 generates files such as a file 1011 that is shown on a screen 1010 in FIG. 11 via the communication unit 403. A description of FIG. 11 will be given below. When a plurality of image forming apparatuses transmit their own status information, a status list for the plurality of image forming apparatuses can be provided on the information processing apparatus 102.

Figure 7:
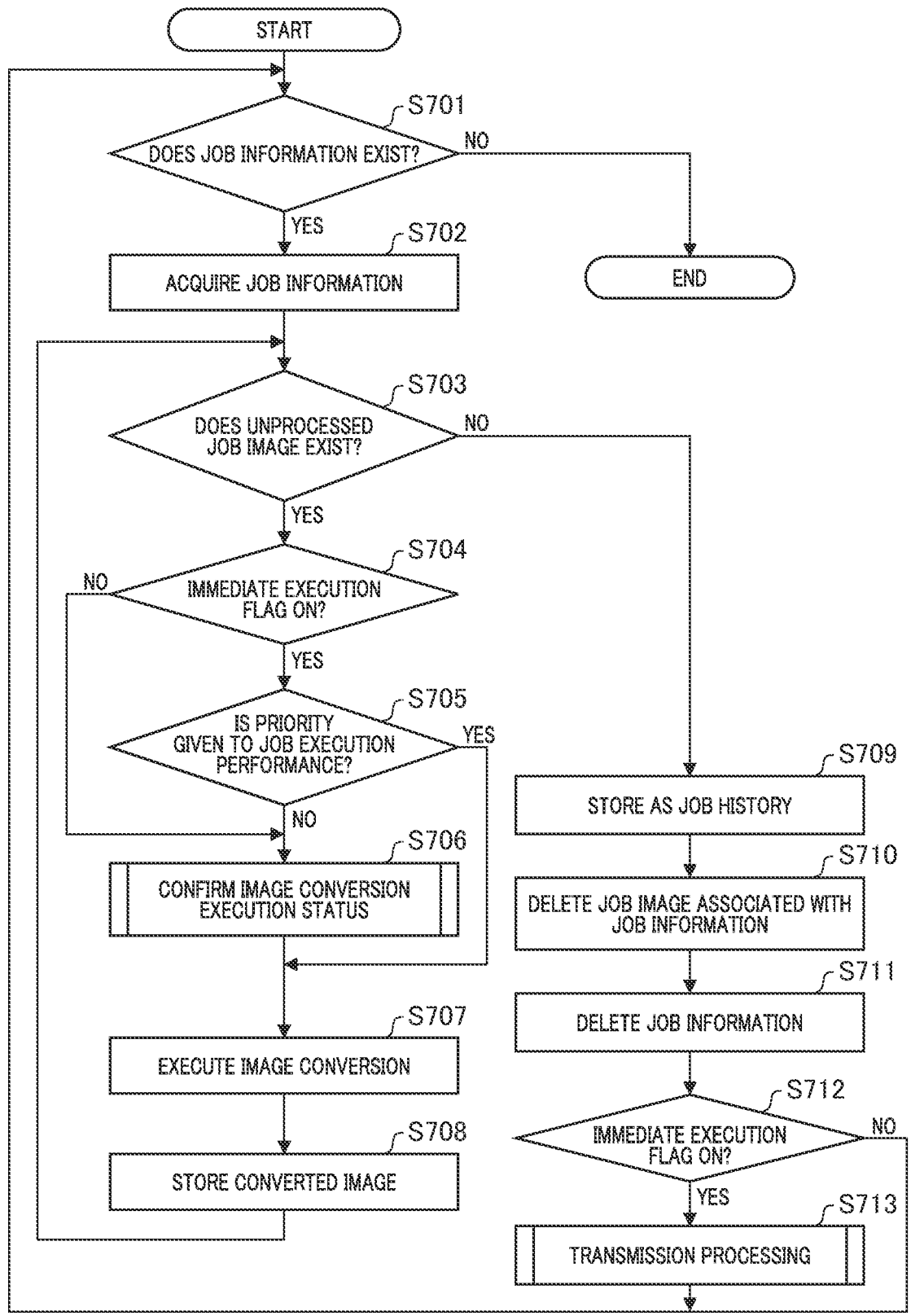
FIG. 7 is a flowchart showing image conversion processing executed by the extension application.

In step S608, the job history management unit 404 immediately executes the image conversion processing shown in FIG. 7. The details will be described below with reference to FIG. 7.

In step S609, the job history management unit 404 confirms whether or not to give a priority to the transfer time setting. Specifically, the job history management unit 404 confirms a setting value for the priority setting 1008 in the transmission processing that has been set in advance on a screen 1000 shown in FIG. 10 via the setting management unit 401. A description of FIG. 10 will be given below. When "priority is given to the transfer time setting" is selected, the transfer processing is performed according to the preset transfer time even when the capacity is close to the upper limit, and the present processing ends without performing the transfer processing. If "priority is given to reservation of the storage region" is selected, the process proceeds to step S610 so that the transfer processing is urgently performed.

Figure 8:
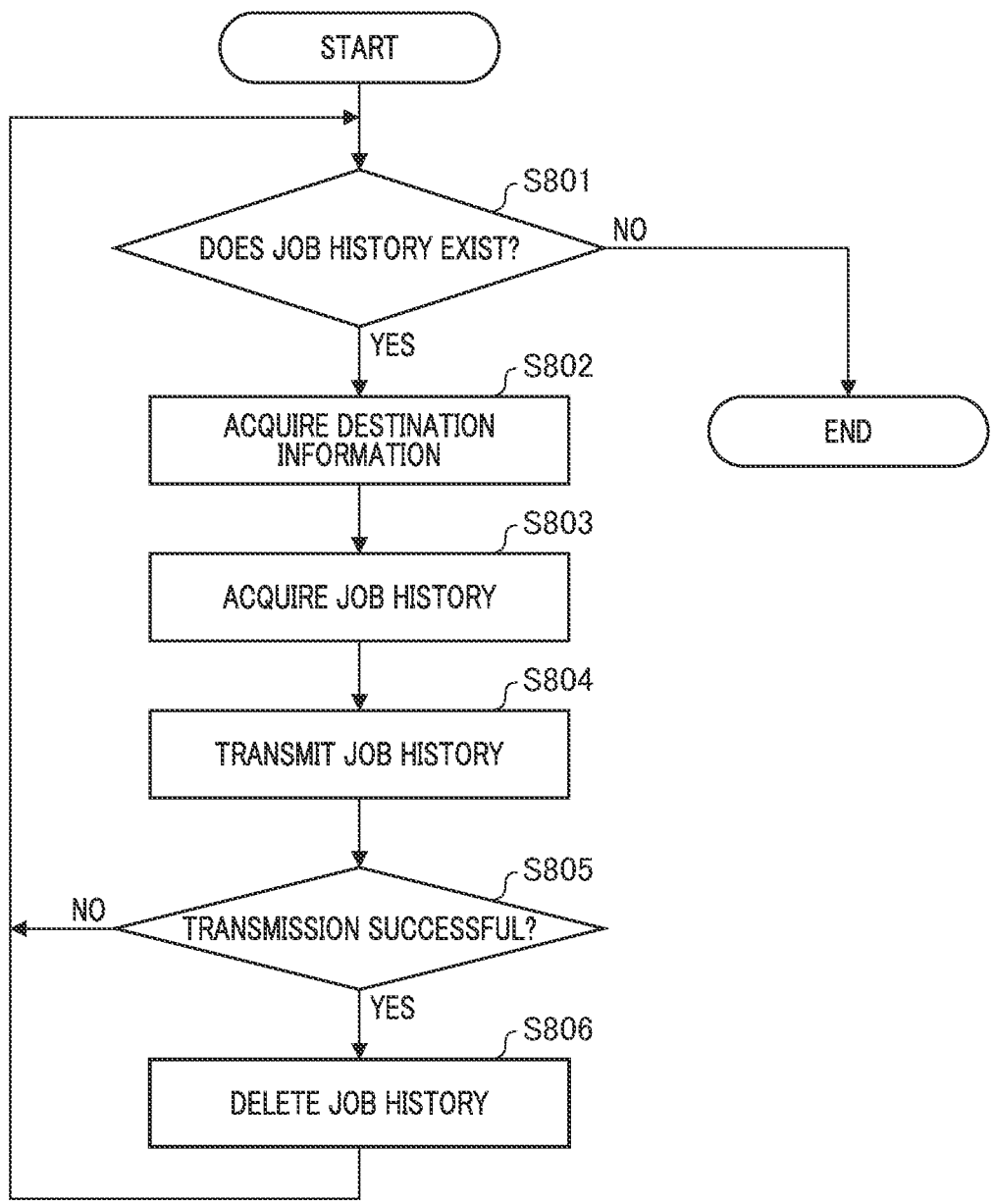
FIG. 8 is a flowchart showing job history transmission processing executed by the extension application.

In step S610, the job history management unit 404 immediately executes the transmission processing shown in FIG. 8. The details will be described below with reference to FIG. 8.

FIG. 7 is a flowchart showing the image conversion processing that the extension application performs. Specifically, the flowchart shows the image conversion processing that the job history management unit 404 performs by using job information or job images. Although this processing is normally periodically and automatically executed, the immediate execution of step S608 in FIG. 6 is performed when an immediate execution instruction is provided.

In step S701, the job history management unit 404 confirms whether or not the job information exists in the job information storage region 1110. The job information indicates the contents shown in Table 1 and is generated in job units. If the job information exists, the process proceeds to step S702, and if the job information does not exist, the process ends.

In step S702, the job history management unit 404 acquires job information. Specifically, it acquires the page information 522 and 523 by using the document information 521 that is indicated by the document information ID "Doc0000A" as shown in Table 1, and uses the page information 522 and 523 for sequentially performing the processing.

In step S703, the job history management unit 404 confirms whether or not an unprocessed page (job image) is present in the page information 522 and 523. When an unprocessed page (job image) is present, the process proceeds to step S704, and when an unprocessed page (job image) is not present, the process proceeds to step S709.

In step S704, the job history management unit 404 confirms whether or not the immediate execution flag was set in step S607. When the immediate execution flag was set (ON state), the process proceeds to step S705, and when the immediate execution flag was not set (OFF state), the process proceeds to step S706. When the immediate execution flag was not set (OFF state), this is a result of determining that the capacity of each storage region is sufficient during the storable capacity check processing performed in FIG. 6, and the confirmation of the image conversion execution status is performed as the normal processing.

In step S705, the job history management unit 404 acquires the setting as to whether or not to give priority to the job execution performance of the image forming apparatus 101 via the setting management unit 401, and confirms the setting value. Specifically, the setting is a setting value in the priority setting 1007 in the image conversion processing shown in FIG. 10, and when "priority is given to the job execution performance of the device" is selected, the process proceeds to step S707. When "priority is given to the reservation of storage region" is selected (when priority is not given to the job execution performance), the process proceeds to step S706.

Figure 9:
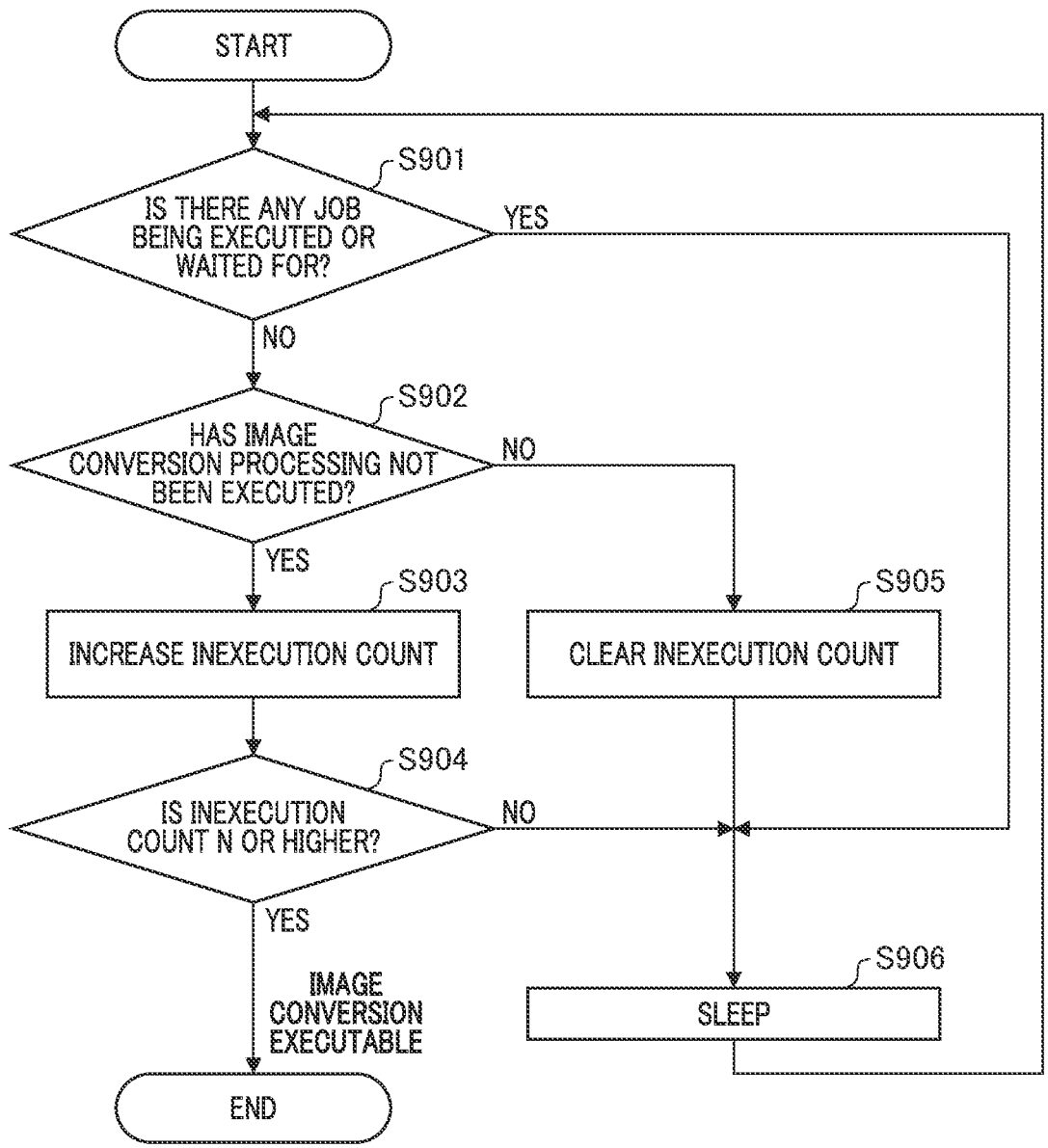
FIG. 9 is a flowchart showing standby processing for when image conversion processing is executed by the extension application.

In step S706, the job history management unit 404 performs the confirmation processing for the image conversion execution status shown in FIG. 9. The details will be described below with reference to FIG. 9.

In step S707, the job history management unit 404 requests the image processing unit 305 to perform the image conversion processing on a page (job image) in order to use the image conversion processing provided by the image forming apparatus 101. During the request, for example, page information 522 for specifying image data and a general-purpose image format after conversion such as a PDF and a JPEG are specified. In addition, the resolution after conversion used for resolution conversion, the presence or absence of OCR processing, and the like may also be specified.

In step S708, the job history management unit 404 acquires the converted image data from the image processing unit 305 and stores it in the job history storage region 1120. In step S707, the image processing unit 305 may directly store the converted image data in the job history storage region 1120 by specifying a storage destination path for the converted image data. Additionally, the storage destination to which the image processing unit 305 directly stores information may be set as the job image storage region 1100, and the job history managing unit 404 may move the image data from the job image storage region 1100 to the job history storage region 1120. Thus, the job history management unit 404 in the present embodiment functions as an example of a control means for controlling the execution of conversion and the storage of the converted data (image data after conversion) in the second region.

In step S709, the job history management unit 404 associates the job information acquired in step S702 with the image data after conversion that was stored in step S708 and stores them as a job history. For example, the job history folder 1121, which uses a job as a unit, is generated in the job history storage region 1120, and the associated data are collected in the folder. After all the information related to the job history is stored, information indicating the completion of transmission preparation is left as a sign thereof. For example, a file having a specific file name with 0 bytes may be generated in the job history folder.

In step S710, the job history management unit 404 instructs the image processing unit 305 to delete the job image associated with the job information acquired in step S702. Specifically, the job history management unit 404 reports the document information ID "Doc0000A" to the image processing unit 305, and deletes the document information 521 corresponding to the document information ID, page information 522 and 523 that are associated with the document information 521, and job images 530 and 531.

In step S711, the job history management unit 404 instructs the job information generation unit 304 to delete the job information that was acquired in step S702.

In step S712, the job history management unit 404 confirms whether or not the immediate execution flag was set in step S607. When the immediate execution flag was set (ON state), the process proceeds to step S713, and if the immediate execution flag was not set (OFF state), the process returns to step S701. Thus, when the storage capacity is close to the upper limit, the transmission processing can be executed in job units for which image conversion processing has been completed.

In step S713, the job history management unit 404 immediately executes the transmission processing shown in FIG. 8.

FIG. 8 is a flowchart showing the job history transmission processing performed by the extension application. Specifically, FIG. 8 illustrates a process in which the job history management unit 404 transmits the job history to the information processing apparatus 102. Typically, this process is periodically and automatically executed. Alternatively, this process is executed at a preset time. Furthermore, when the immediate execution instruction in step S610 in FIG. 6 is provided, the process is immediately executed.

In step S801, whether or not the job history stored in step S709 exists in the job history storage region 1120 is confirmed. When the job history exists, the process proceeds to step S802, and if the job history does not exist, the transmission processing ends.

In step S802, the job history management unit 404 acquires the destination information from the setting management unit 401. The destination information is, for example, the destination setting 1001 that is shown on the screen 1000 in FIG. 10, specifically, a URL, a domain name, a username, and a password for a WebDAV connection destination. The destination information may also be an address and API for a server application, a folder path, a domain name, a username, and a password for an SMB shared folder.

In step S803, the job history management unit 404 acquires the job history that has been confirmed to exist in step S801 from the job history storage region 1120. The examples of the job history to be acquired include the job history having the oldest job execution date and time.

In step S804, the job history management unit 404 transmits the job history acquired in step S803 to the destination acquired in step S802 via the communication unit 403. Thus, the communication unit 403 in the present embodiment is an example of a transmission means for transmitting the job history to the outside.

In step S805, the job history management unit 404 confirms the transmission results for step S804. When the transmission was successful, the process proceeds to step S806, and if the transmission was unsuccessful, the process proceeds to step S801 to retry the transmission processing.

In step S806, the job history management unit 404 deletes the job history that was transmitted in step S804 from the job history storage region 1120.

FIG. 9 is a flowchart showing the standby processing when the extension application executes the image conversion processing. In FIG. 7, this processing is performed to avoid decreases in the performance of the job execution flow of the image forming apparatus 101 shown in FIG. 5 when the job history management unit 404 executes the image conversion processing on the job image. Specifically, the standby processing is the processing of waiting for the image conversion processing until the job execution of the image forming apparatus 101 has been completed.

In step S901, the job history management unit 404 confirms whether or not a job that is being executed or a job that is on standby exists via the job control unit 302. If a job that is being executed or a job that is on standby does not exist, the process proceeds to step S902, and if it exists, the process proceeds to step S906, and sleep is performed for a predetermined period of time while waiting for the processing. Thus, in the present embodiment, the absence of a job to be executed is an example of a conversion condition for executing the conversion of a job image at a normal time.

In step S902, the job history management unit 404 confirms whether or not the image conversion processing is executed via the image processing unit 305. Since an image conversion module can be used by a plurality of extension applications in order, the use status needs to be confirmed separately from the jobs that are managed by the job control unit 302. If the image conversion processing is not executed, the process proceeds to step S903, and when it is executed, the process proceeds to step S905.

In step S903, an inexecution count is increased by one time. Next, in step S904, whether or not the inexecution count is a specific number of times (for example, six times) or more is confirmed. In this context, the number of times for the inexecution count is used to detect an interval of the jobs, taking into consideration the sleep time in step S906. For example, it is assumed that it takes two seconds to perform the image conversion for one page. When the checks are performed six times (S904) during the sleep state at an interval of 0.5 seconds (S906), the image conversion processing is not executed for 0.5 seconds×6 times=3 seconds, and it is determined that this shows an interval of jobs, and the standby processing ends.

If it is determined in step S902 that the image conversion processing is executed, the process proceeds to step S906 in order to clear the inexecution count and retry the detection of the interval of jobs, and the processing enters a sleep state for a predetermined period of time and is waited for.

Figure 11:
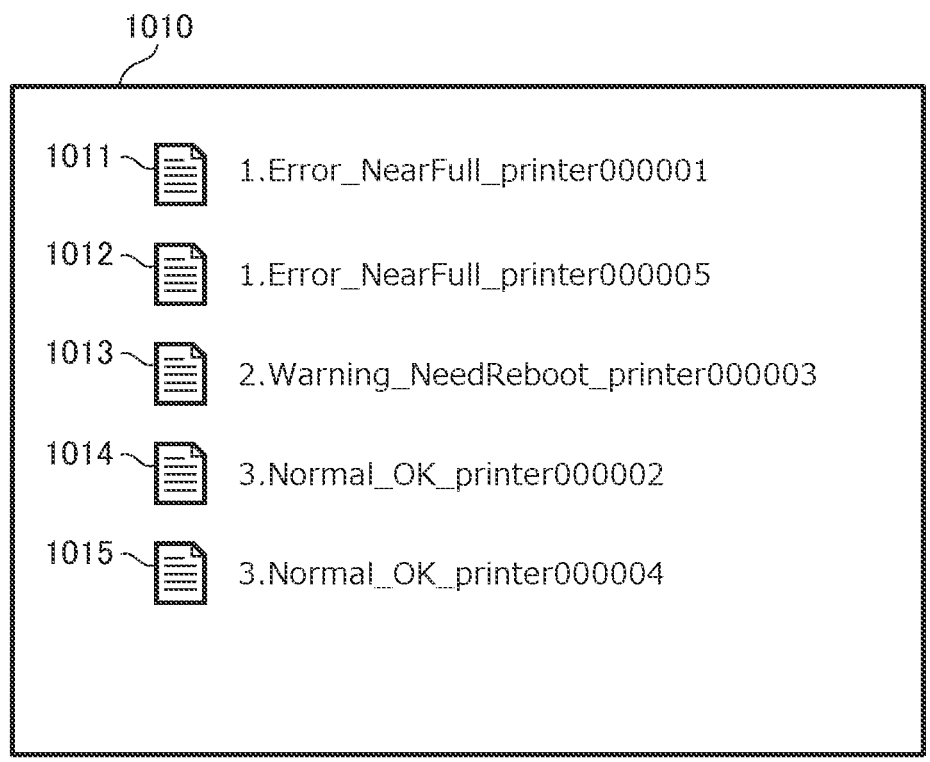
FIG. 11 shows an example of the screen of the extension application.

FIGS. 10 and 11 illustrate an example of a screen of the extension application. FIGS. 10 and 11 illustrate an example of a UI provided by a client that is the extension application. When the UI is shown to the user, a screen control unit 405 displays a screen on the display device 207. Thus, the input from the input device 206 is received.

In FIG. 10, the screen 1000, which is an example of a screen for performing the setting necessary for the operation of the client, is shown. A URL, a username and a password for a transmission destination are specified in the destination setting 1001. It is assumed that the domain name is specified in a general format such as the username. The domain name is an input value, for example, "<domain name>Y<user name>".

In the transmission schedule setting 1002, for example, a transmission start time is set to show a timing for transmitting the job history to the information processing apparatus 102. In addition to the transmission start time, for example, a transmission stop time, a transmission interval for periodic transmission, and the like may be specified.

In the client state 1003, status information for the client is displayed. For example, when it is determined in step S607 in FIG. 6 that the capacity of the storage region is close to the upper limit, the display of "storage region is close to the upper limit" is performed in the status 1004, together with the display of a warning mark. The user who has confirmed the display can perform immediate execution processing by pressing the immediate execution button 1005. During the immediate execution processing, a job history is generated based on the job information and the job image that exist in the image forming apparatus 101, and all the job histories are transmitted to the information processing apparatus 102 together with the job histories that have already been generated. Specifically, step S607, step S608, and step S610 shown in FIG. 6 are executed.

The operation setting 1006 when the storage region is close to the upper limit is an operation setting for when the capacity of the storage region is determined to be close to the upper limit. As described in step S705, in the priority setting 1007 of the image conversion processing, if priority is given to the job execution performance, "priority is given to job execution performance of device" is selected. If priority is not given to job execution performance (waiting for job completion), "priority is given to reservation of storage region" is selected. Additionally, in the priority setting 1008 of the transmission processing, if the transfer processing is performed according to the preset transfer time even when the capacity is close to the upper limit, "priority is given to the transfer time setting" is selected, as described in step S609. If the transfer processing is performed urgently because the capacity is close to the upper limit, "priority is given to reservation of storage region" is selected.

The screen control unit 405 stores each setting value in the storage device 204 via the setting management unit 401 by pressing the setting button 1009.

In FIG. 11, an example of a screen for confirming the status of a client on the information processing apparatus 102 is illustrated. The status of the client is periodically transmitted to the information processing apparatus 102 by the main control unit 402 via the communication unit 403. The status of the client is transmitted to the information processing apparatus 102 as a file in which the status information is described. If the job history management unit 404 determines in step S607 that the capacity of the storage region is close to the upper limit, the job history management unit 404 transmits the file in which the status information is described to the information processing apparatus 102 via the communication unit 403.

For example, the screen 1010 is an example of referring to a file on Windows Explorer, and the file name is, for example, "<status classification>_<status information>_<device information>".

In the case of the screen 1010, the status classification is an error ("1. Error") and the status information is "NearFull" for the printer000001 in the file 1011 and the printer000005 in the file 1012. This is due to the capacity of the storage region being determined to be close to the upper limit.

Regarding the printer000003 in a file 1013, the status classification is a warning ("2. Warning") and the status information is "NeedReboot", and it is recognized that a re-start is required.

The status classification is "Normal" and the status information is "OK", for the printer000002 in a file 1014 and the printer000004 in a file 1015, and it is recognized that they are normal.

Thus, it is possible to confirm the status of a plurality of clients at the same time by collecting the information regarding a plurality of image forming apparatuses 101 in one folder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-189529, filed Nov. 22, 2021, which is hereby incorporated by reference herein in its entirety.

What is claimed is:

1. An image processing apparatus, which records log information related to image data and job attribute information for one or more executed jobs, the image processing apparatus comprising:
a memory storing instructions; and
a processor executing the instructions causing the image processing apparatus to:
reserve a plurality of regions including a region for the log information;
convert image data from a first region into data in a predetermined format,
control execution of conversion if a conversion condition is satisfied and storage of the converted data in a second region;
externally transmit log information that includes job attribute information corresponding to the converted data based on the converted data that are stored in the second region;
execute conversion of unprocessed image data in the first region and transmission of the log information based on the converted data even if the conversion condition is not satisfied if an amount of job-related information that is stored in the first region satisfies a first condition; and
execute the conversion of the unprocessed image data in the first region and the transmission of the log information based on the converted data even if an amount of job-related information that is stored in the second region satisfies a second condition.

2. The image processing apparatus according to claim 1, wherein the conversion condition is that a job to be executed is not present in the image processing apparatus.

3. The image processing apparatus according to claim 1, wherein the processor transmits the job attribute information, the image data, and the log information if either of the first condition or the second condition is satisfied.

4. The image processing apparatus according to claim 3, wherein the processor transmits the converted data at the end of the conversion processing of the image data if either of the first condition or the second condition is satisfied.

5. The image processing apparatus according to claim 1, wherein the first condition is that an amount of the job-related information relative to storable capacity of the first region exceeds a predetermined threshold.

6. The image processing apparatus according to claim 1, wherein the second condition is that the amount of the job-related information relative to the storable capacity of the second region exceeds a predetermined threshold.

7. The image processing apparatus according to claim 1, wherein the processor transmits information indicating that the first condition or the second condition is satisfied if the first condition or the second condition is satisfied.

8. The image processing apparatus according to claim 1, wherein the processor reserves a third region that is different from the first region and the second region;
wherein the processor copies the job attribution information to the third region before the conversion of the image data, and deletes the job attribute information from the first region after the conversion of the image data.

9. A method for controlling of an image processing apparatus which reserves a plurality of regions including a region for recording log information regarding image data and job attribute information for one or more executed jobs, the method comprising:
converting image data from a first region into data in a predetermined format;
controlling execution of conversion if a conversion condition is satisfied and storage of the converted data in a second region;
externally transmitting log information that includes job attribute information corresponding to converted data based on the converted data that are stored in the second region;

executing conversion of unprocessed image data in the first region and the transmission of the log information based on the converted data even if the conversion condition is not satisfied if an amount of job-related information that is stored in the first region satisfies a first condition; and executing the conversion of the unprocessed image data in the first region and the transmission of the log information based on the converted data even if an amount of job-related information that is stored in the second region satisfies a second condition.

10. A non-transitory storage medium on which is stored a computer program related to a method for controlling an image processing apparatus which reserves a plurality of regions including a region for recording log information regarding image data and job attribute information for one or more executed jobs, the method comprising:

converting image data from a first region into data in a predetermined format;

controlling execution of conversion if a conversion condition is satisfied and storage of the converted data in a second region;

externally transmitting log information that includes job attribute information corresponding to the converted data based on the converted data that are stored in the second region;

executing conversion of unprocessed image data in the first region and transmission of the log information based on the converted data even if the conversion condition is not satisfied if an amount of job-related information that is stored in the first region satisfies a first condition; and executing the conversion of the unprocessed image data in the first region and the transmission of the log information based on the converted data even if an amount of job-related information that is stored in the second region satisfies a second condition.

* * * * *